United States Patent
Yao et al.

(10) Patent No.: US 10,503,642 B2
(45) Date of Patent: Dec. 10, 2019

(54) CACHE COHERENCE DIRECTORY ARCHITECTURE WITH DECOUPLED TAG ARRAY AND DATA ARRAY

(71) Applicants: Huawei Technologies Co., Ltd., Shenzhen (CN); National University of Singapore, Singapore (SG)

(72) Inventors: Yuan Yao, Singapore (SG); Tulika Mitra, Singapore (SG); Zhiguo Ge, Singapore (SG); Naxin Zhang, Singapore (SG)

(73) Assignees: Huawei Technologies Co., Ltd., Shenzhen (CN); National University of Singapore, Singapore (SG)

( * ) Notice: Subject to any disclaimer, the term of this patent is extended or adjusted under 35 U.S.C. 154(b) by 123 days.

(21) Appl. No.: 15/686,846

(22) Filed: Aug. 25, 2017

(65) Prior Publication Data

US 2017/0351612 A1    Dec. 7, 2017

Related U.S. Application Data

(63) Continuation of application No. PCT/CN2015/073346, filed on Feb. 27, 2015.

(51) Int. Cl.
| | |
|---|---|
| *G06F 3/06* | (2006.01) |
| *G06F 11/14* | (2006.01) |
| *G06F 12/00* | (2006.01) |
| *G06F 17/30* | (2006.01) |
| *G06F 12/0817* | (2016.01) |
| *G06F 12/02* | (2006.01) |

(52) U.S. Cl.
CPC ........ *G06F 12/0817* (2013.01); *G06F 12/023* (2013.01); *G06F 2212/604* (2013.01)

(58) Field of Classification Search
CPC .................................................. G06F 12/0817
See application file for complete search history.

(56) References Cited

U.S. PATENT DOCUMENTS

| | | | |
|---|---|---|---|
| 2003/0009643 A1* | 1/2003 | Arimilli | G06F 12/0813 711/155 |
| 2005/0010723 A1 | 1/2005 | Cho et al. | |
| 2006/0288171 A1 | 12/2006 | Tsien | |
| 2014/0229680 A1 | 8/2014 | Solihin | |

FOREIGN PATENT DOCUMENTS

WO    2014021853 A1    2/2014

OTHER PUBLICATIONS

Fang et al., "Building Expressive, Area-Efficient Coherence Directories," IEEE, pp. 299-308, Institute of Electrical and Electronics Engineers, New York, New York (2013).

(Continued)

*Primary Examiner* — Jared I Rutz
*Assistant Examiner* — Marwan Ayash
(74) *Attorney, Agent, or Firm* — Leydig, Voit & Mayer, Ltd.

(57) ABSTRACT

A data processing method includes allocating a tag entry in a tag array for a data block; allocating a data entry in a data array for the data block when the data block is actively shared; and de-allocating the data entry when the data block is temporarily private or gets evicted in the data array.

10 Claims, 6 Drawing Sheets

(56) References Cited

OTHER PUBLICATIONS

Ferdman et al.,"Cuckoo Directory: A Scalable Directory for Many-Core Systems," IEEE, pp. 169-180, Institute of Electrical and Electronics Engineers, New York, New York (2011).
Zebchuk et al.,"Multi-Grain Coherence Directories," MICRO'46, pp. 359-370, ACM, Davis, CA, USA (Dec. 7-11, 2013).
Sanchez et al.,"SCD: A Scalable Coherence Directory with Flexible Sharer Set Encoding," Proceedings of the 18th International Symposium on High Performance Computer Architecture (HPCA), pp. 1-12, (2012).
Alisafaee et al.,"Spatiotemporal Coherence Tracking," 2012 IEEE/ACM 45th Annual International Symposium on Microarchitecture, pp. 341-350, Institute of Electrical and Electronics Engineers, New York, New York (2012).
Albericio et al.,"The Reuse Cache: Downsizing the Shared Last-Level Cache," MICRO '46, pp. 310-321, ACM, (Dec. 7-11, 2013).
Qureshi et al.,"The V-Way Cache : Demand-Based Associativity via Global Replacement," Proceedings of the 32nd International Symposium on Computer Architecture (ISCA'05), Institute of Electrical and Electronics Engineers, New York, New York (2005).

* cited by examiner

| Component | 2x | SelectDirectory |
|---:|:---:|:---:|
| Tag | 19 | 19 |
| State | 3 | 3 |
| Replacement | 4 | 4 |
| First requestor ID/FPtr | - | 5 |
| Total tag entry (bits) | 26 | 31 |
| Sharer vector | 32 | 32 |
| Valid | - | 1 |
| Replacement | - | 4 |
| RPtr | - | 6 |
| Total data entry (bits) | 32 | 43 |
| Tag array (K entries) | 256 | 256 |
| Data array (K entries) | 256 | (32) 64 |
| Total size (Kbits) & Reduction | 14848 | (9312, 37.3%) 10688, 28.0% |

Directory of 32 core

Fig.3a

| Component | 2x | SelectDirectory |
|---|---|---|
| Tag | 18 | 18 |
| State | 3 | 3 |
| Replacement | 4 | 4 |
| First requestor ID/FPtr | - | 6 |
| Total tag entry (bits) | 25 | 31 |
| Sharer vector | 64 | 64 |
| Valid | - | 1 |
| Replacement | - | 4 |
| RPtr | - | 6 |
| Total data entry (bits) | 64 | 75 |
| Tag array (K entries) | 512 | 512 |
| Data array (K entries) | 512 | (32) 64 |
| Total size (Kbits) & Reduction | 46592 | (18272, 60.8%) 20672, 55.6% |

Directory of 64 core

CACHE COHERENCE DIRECTORY ARCHITECTURE WITH DECOUPLED TAG ARRAY AND DATA ARRAY

CROSS-REFERENCE TO RELATED APPLICATIONS

This application is a continuation of International Application No. PCT/CN2015/073346, filed on Feb. 27, 2015, the disclosure of which is hereby incorporated by reference in its entirety.

FIELD OF TECHNOLOGY

The disclosure relates to the technical field of the data processing, and in particular to a data processing method and device in cache coherence directory architecture.

BACKGROUND OF THE INVENTION

A considerable consensus has been reached that cache coherence will continue to be employed in future large-scale systems. With the rapid increase in the number of cores on chip, the scalability of a coherence protocol is highly challenging, and maintaining coherence for hundreds or thousands of cores will be unprecedentedly difficult. Although directory coherence protocols offer a relatively practical approach, there is growing concern that simply applying the directory coherence to many-core domain will face serious power and area issues.

SUMMARY OF THE INVENTION

Exemplary embodiments of the disclosure relates to a data processing method and device in a cache coherence directory architecture.

In a first aspect, there is provided a data processing method in a cache coherence directory architecture, the method comprising: allocating a tag entry in a tag array for a data block; allocating a data entry in a data array for the data block when the data block is actively shared; and de-allocating the data entry when the data block is temporarily private or gets evicted in the data array.

In a first possible implementation form of the method according to the first aspect as such, when the data entry is de-allocated, the tag entry comprises an owner pointer for indicating an exclusive owner of the data block.

In a second possible implementation form of the method according to the first aspect as such or according to the any of the preceding implementation forms of the first aspect, when the data entry is allocated, the tag entry comprises a forward pointer for indicating a position of the data entry.

In a third possible implementation form of the method according to the first aspect as such or according to the any of the preceding implementation forms of the first aspect, the data entry comprises a reverse pointer for indicating a position of the tag entry.

In a fourth possible implementation form of the method according to the first aspect as such or according to the any of the preceding implementation forms of the first aspect, when the data entry is allocated, the tag entry and the data entry are linked through hardware hash components and tag selection bits in the tag entry.

In a second aspect, there is provided a data processing device in a cache coherence directory architecture, the device comprising a cache and a processor, wherein the cache comprises a tag array and a data array; the processor is configured to allocate a tag entry in the tag array for a data block; and the processor is further configured to allocate a data entry in the data array for the data block when the data block is actively shared, and de-allocate the data entry when the data block is temporarily private or gets evicted in the data array.

In a first possible implementation form of the method according to the second aspect as such, when the data entry is de-allocated, the tag entry comprises an owner pointer for indicating an exclusive owner of the data block.

In a second possible implementation form of the method according to the second aspect as such or according to the any of the preceding implementation forms of the second aspect, when the data entry is allocated, the tag entry comprises a forward pointer for indicating a position of the data entry.

In a third possible implementation form of the method according to the second aspect as such or according to the any of the preceding implementation forms of the second aspect, the data entry comprises a reverse pointer for indicating a position of the tag entry.

In a fourth possible implementation form of the method according to the second aspect as such or according to the any of the preceding implementation forms of the second aspect, when the data entry is allocated, the tag entry and the data entry are linked through hardware hash components and tag selection bits in the tag entry.

Therefore the embodiments of the disclosure allocate data entry only when a data block is actively shared and will not allocate data entry for data block which is not actively shared, therefore smaller directory size can be achieved.

BRIEF DESCRIPTION OF THE DRAWINGS

In order to more clearly describe embodiments of the disclosure, the accompanying drawings are provided and are briefly described below. It will be appreciated that these drawings are exemplary and that other drawings can be obtained from these drawings without any creative effort.

FIG. 3a and FIG. 3b show the directory sizes for an exemplary embodiment of the disclosure and for a traditional directory

DETAILED DESCRIPTION OF THE EMBODIMENTS

Hereinafter, technical solutions in embodiments of the disclosure are clearly described in connection with the accompanying drawings showing these embodiments.

Prior work observes that a dominated fraction of blocks stored in the on-chip cache hierarchy is temporarily private. A piece of data (or referred to as "block" or "data block") is called temporarily private if it is currently cached by only one core. Similarly, a piece of data is actively shared at a particular time, if it is cached by at least two cores.

Relying on this fact, the embodiments of the disclosure provide a cache coherence directory architecture, called SelectDirectory in the specification, that decouples the tag array and the data array, and allocates data entries only for actively shared blocks in order to reduce the size of directory without degrading the performance.

Figure 1:
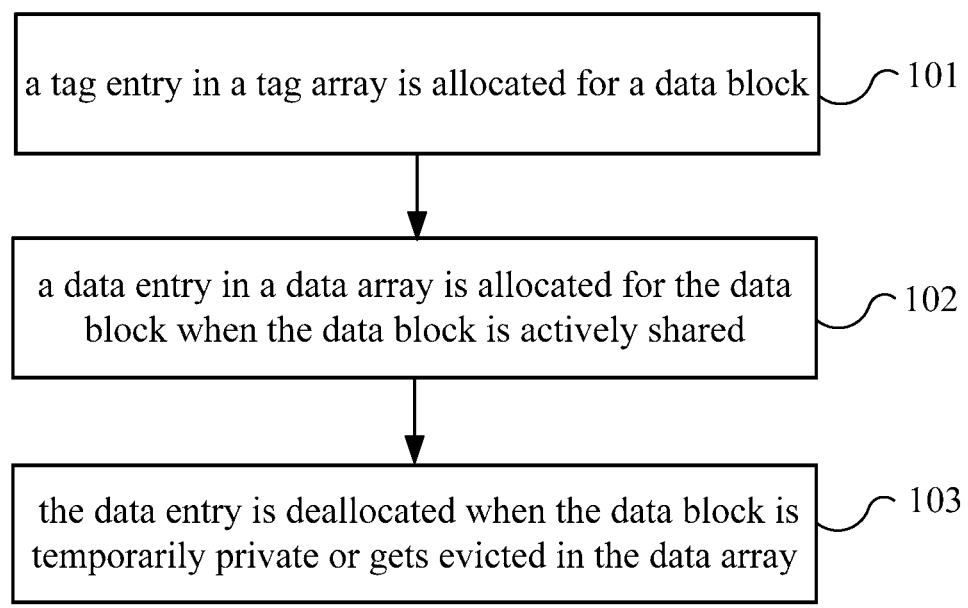
FIG. 1 shows a data processing method of an embodiment of the disclosure.

FIG. 1 shows a data processing method of an embodiment of the disclosure. The method of FIG. 1 is performed in a cache coherence directory architecture, such as a shared memory many-core architecture.

101: a tag entry in a tag array is allocated for a data block.

102: a data entry in a data array is allocated for the data block when the data block is actively shared.

103: the data entry is de-allocated when the data block is temporarily private or gets evicted in the data array.

Therefore the embodiments of the disclosure allocate a data entry only when a block is actively shared and will not allocate a data entry for a block which is not actively shared, therefore smaller directory size can be achieved.

For example, the de-allocation of a data entry may concern at least one of the actions of not allocating a data entry, and removing or invalidating an existing data entry.

In particular, for a conventional sparse directory, similar to an associative cache, the structure includes a tag array and data array. A directory entry has its tag and state in the tag array and sharer tracking information in the data array. For the identities of the sharers, a bit vector is commonly used for coherence tracking where one bit represents its corresponding core. The aforementioned sharing pattern is exploited to design SelectDirectory that allocates one entry in the data array only when the block becomes actively shared. In addition, when the block transitions back to temporarily private states or gets evicted in the data array, the data entry is de-allocated. Temporarily private blocks only have tag entries allocated. Thus, the data array size is greatly reduced and accordingly lower energy consumption with negligible performance loss can be achieved.

It is to be noted that the steps in the method of FIG. 1 may be performed in other orders, which is also within the scope of the disclosure. For example, the step 101 may be performed independently of or in parallel with the steps 102 and/or 103.

For another example, the step 102 may be performed before or after the step 103 according to a transition of the sharing state of the data block. As an optional and particular embodiment, in a case where a data block is private initially, the steps 101 and 103 may be performed at first wherein no data entry should be allocated to the data block and only a tag entry will be allocated to the data block, and when the data block transitions are to be shared the step 102 may be performed wherein a data entry will be allocated to the data block.

As another optional and particular embodiment, in a case where a data block is shared initially, the steps 101 and 102 may be performed at first wherein a data entry and a tag entry will be allocated to the data block, and when the data block transitions to not be shared the step 103 may be performed wherein the data entry will be removed or invalidated.

Figure 2:
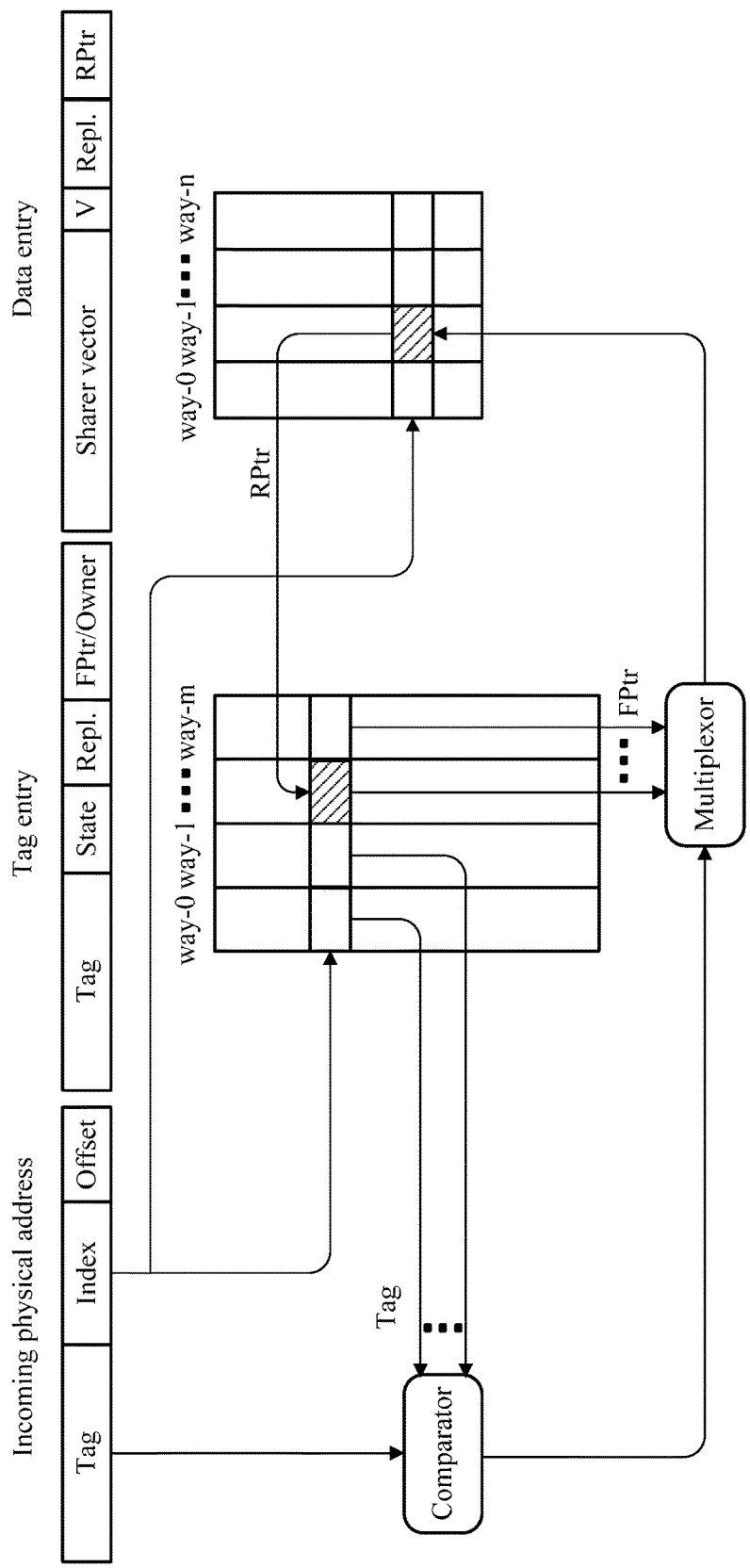
FIG. 2 shows an entry format in an embodiment of the disclosure.

FIG. 2 shows an entry format in an embodiment of the disclosure. In the embodiment of FIG. 2, when the data entry is de-allocated, the tag entry includes an owner pointer for indicating an exclusive owner of the block. As another aspect, when the data entry is allocated, the tag entry includes a forward pointer for indicating a position of the data entry. Further, the data entry may include a reverse pointer for indicating a position of the tag entry.

In particular, FIG. 2 shows the structure of SelectDirectory and the formats of tag and data entries therein. By decoupling the tag array and the data array, SelectDirectory breaks the one-to-one mapping of tag and data, thus the data array can have less number of entries than the tag array. As is shown in FIG. 2, a forward pointer FPtr and a reverse pointer RPtr are employed for associating the two arrays. The forward pointer FPtr in the tag array links the tag to one data line, and a reverse pointer RPtr in the data array indicates its tag position in the tag array. Each tag entry is also extended with an owner pointer, which is for a temporarily private block to track its exclusive owner.

Since the position of a data entry is encoded in the forward pointer FPtr, lookup in the data array does not require any associative search. So increasing the associativity of the data array does not have an impact on power consumption. Nevertheless, as the associativity of the data array increases, a bigger forward pointer FPtr in the tag array may be needed. Take the example of 32-core CMP (Chip Multiprocessor), a parameter SD (tag provision ratio, data provision ratio) is used to refer to the provisioning ratios of the tag array and the data array of a SelectDirectory configuration. SD(tx, dx) refers to the numbers of tag entries and data entries relative to the aggregated number of all private cache entries, where t and d are the ratios of the tag array and the data array respectively. For a fully associative data array, every tag entry will have a $\log_2$(data entries) bit forward pointer. Note that the forward pointer and the owner pointer are exclusively being alive. For a temporarily private block, the forward pointer bits are unused because it only has a tag entry allocated. While for an actively shared block, the owner pointer is redundant as it has been encoded in the sharer vector. To minimize storage overhead of the design, the forward pointer and the owner pointer can share the same storage in the tag array. The cache controller interprets the bits differently according to the block's sharing status. The detailed operations of SelectDirectory will be described as follows.

In operations relating to lookup and data allocation, upon a miss in the tag array, instead of conventionally allocating both tag and sharer vector, SelectDirectory only allocates a tag and keeps the owner in the tag entry. Upon a hit in the tag array, several situations can happen depending on the block states and the request type.

If the block is temporarily private, a read request will make the block transition into actively shared states. Upon that, SelectDirectory allocates a data entry and encodes the owner and the requester in the sharer vector. This may be called an upgrade action. A write request will keep the block as temporarily private, but the owner is changed. The request is forwarded to the old owner.

If the block is actively shared, the forward pointer will be used to locate the position of the corresponding data entry in the data array. The operations of a read request are conventional. However, for a write request, the block becomes temporarily private again, which makes opportunities for creating space in the data array. Therefore, in parallel to sending invalidation messages to the sharers, SelectDirectory de-allocates the entry in the data array and overwrites the forward pointer with the new owner. This action may be denoted as downgrade.

In operations relating to replacement and private cache eviction, the replacement can happen both in the tag array and the data array. A tag replacement will evict both the tag and the data entries if it is linked to a data entry. For a data array eviction, SelectDirectory will perform another type of downgrade. SelectDirectory keeps the tag entry in the tag array, and in addition, it picks one sharer and invalidates the others. The forward pointer in the tag entry is then covered by the picked sharer. This optimization reduces the number of blocks to be invalidated, and keeping the tag and a sharer alive also improves latency for future access to the block.

On receiving eviction notifications from private caches, a block with only a tag entry will be marked invalid. For a block with tag and data entries, one possible situation is that only one sharer is left after the private cache eviction. In this case, the data entry is not proactively downgraded to the tag array because the data entry is likely to be soon evicted and downgraded by another entry. When receiving the last sharer's private cache eviction notification, both the tag entry and the data entry will be reclaimed by SelectDirectory.

FIG. 3a and FIG. 3b show the directory sizes of SelectDirectory of the disclosure and of the traditional directory. FIG. 3a and FIG. 3b refer to the numbers for 32 core and 64 core platforms, respectively. For each platform, FIG. 3a and FIG. 3b show the results of SD(2×, ¼×) and SD(2×, ⅛×), where the numbers of SD(2×, ⅛×) are in brackets. As shown in FIG. 3a and FIG. 3b, SelectDirectory can achieve significant size reduction over the traditional directory.

Also, FIG. 3a and FIG. 3b show components that can be included in the respective entries, in which case the first requestor ID (as an example of owner pointer) may occupy the same bits as the forward pointer FPtr. The components such as 'Tag', 'State' and 'Replacement' in the tag entries, and 'Sharer vector' in the data entries are known to those skilled in the art and thus will not be described in detail. The component 'Valid' in the data entries stands for the valid bit of the data entry, and 'Replacement' stores the information, such as LRU (Least Recently Used) information, that is used to guide the data entry replacement.

It is to be noted that the specific numbers of bits and names of the components as shown in FIG. 3a and FIG. 3b are illustrative examples but not intended to limit the embodiments of the disclosure. Those skilled in the art can delete/modify these components and/or add other components as appropriate which are still in the scope of the disclosure.

Figure 4:
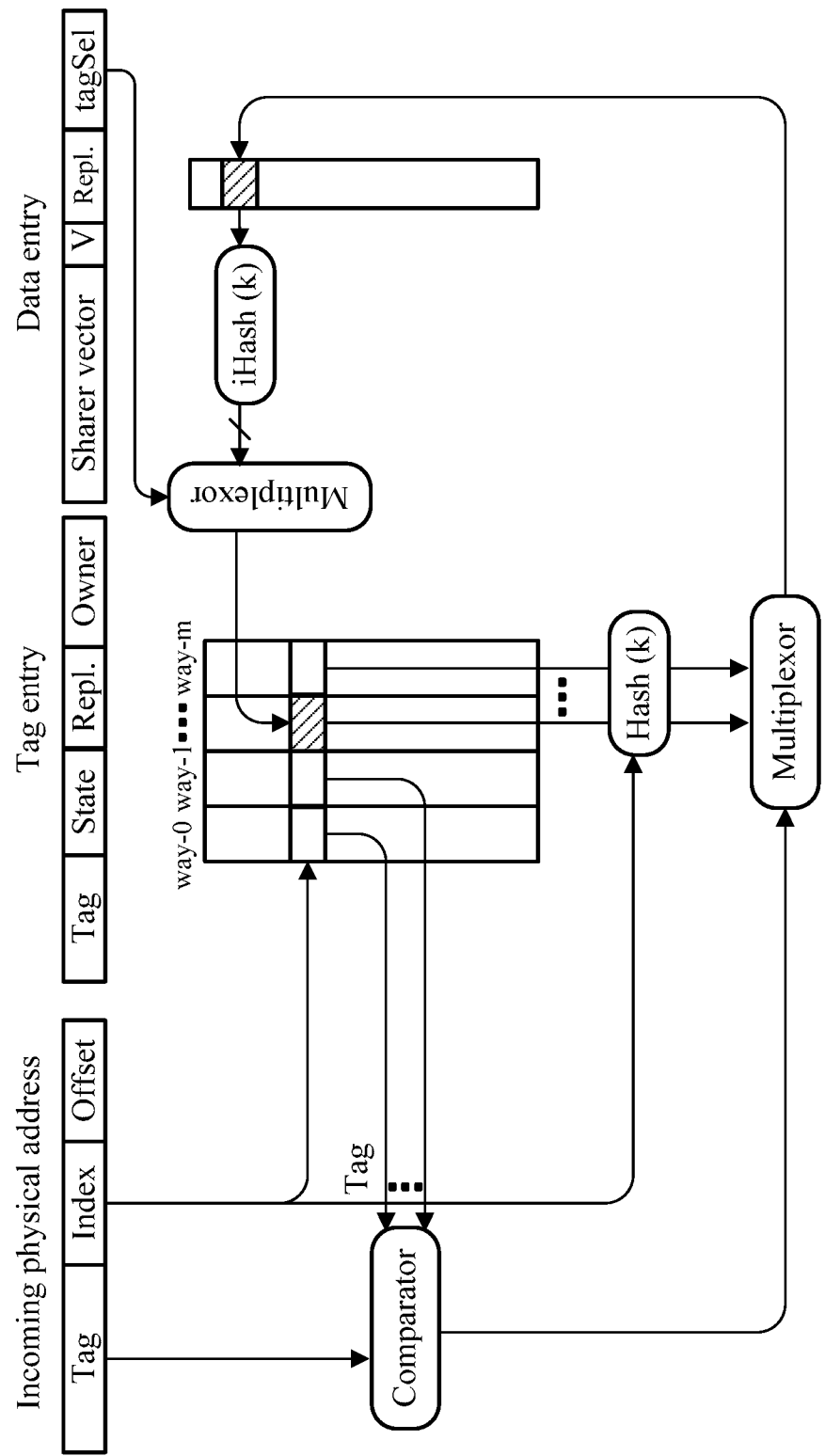
FIG. 4 shows an entry format in another embodiment of the disclosure.

FIG. 4 shows an entry format in another embodiment of the disclosure. In particular, FIG. 4 shows an alternative organization and architecture of SelectDirectory.

In the embodiment of FIG. 4, the tag entry and data entry are linked through hardware hash components and tag selection bits (i.e., 'tagSel' in the data entry).

For a SelectDirectory whose number of tag entries is N times that of data entries, every N tag entries are hashed to the same data entry. The tagSel in data entry encodes the tag entry linked to it. The width of tagSel can be $\log_2(N)$ bits.

The forward search will first get the data entry and then check whether tagSel is corresponding to the tag. If tagSel corresponds to the tag, then the search hits, and the data entry is valid for use. Otherwise, the search misses, which causes data entry eviction. Similarly, the backward search first gets the N tag entry candidates using hash component, and then the tag entry linked to the data entry is chosen using tagSel.

The embodiment of FIG. 4 removes the forward pointer and a reverse pointer in the design of architecture of FIG. 2. As a result, hardware resources can be reduced.

In SelectDirectory of the disclosure, a block can have no data entry allocated. SelectDirectory utilizes the sharing status of the block to perform appropriate operations. The coherence states of the directory controller are adequate to give the information, which does not introduce any extra overhead. In a conventional MESI coherence protocol, the sparse directory controller has three stable states: MSI. Note that a directory entry cannot be in E state (E and M are both represented by M in the directory). A block in M state is potentially modified by its exclusive owner, and a block in S state indicates the block is present in multiple private caches. The nature of M and S states is sufficient for SelectDirectory to identify whether the block is temporarily private. a block in M state only has its tag entry allocated, while a block in S state has entries in the tag and data arrays. Therefore, SelectDirectory does not require any new coherence states. On the other hand, the downgrade action will minimally change the coherence protocol. When downgrading a block from the data array to the tag array due to a data eviction, the state of the downgraded block is changed from S to M. Overall, SelectDirectory does not introduce complexity to the coherence protocol.

Figure 5:
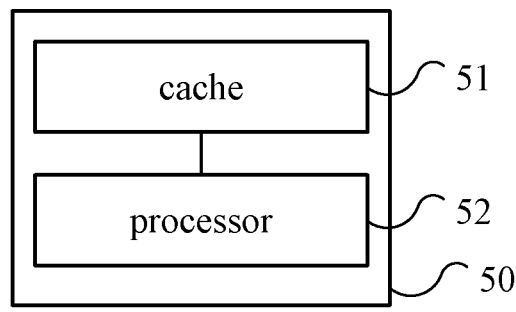
FIG. 5 shows a data processing device of an embodiment of the disclosure.

FIG. 5 shows a data processing device of an embodiment of the disclosure. The device 50 of FIG. 5 is embodied in a cache coherence directory architecture, such as a shared memory many-core architecture.

As shown in FIG. 5, the device 50 includes a cache 51 and a processor 52. For example, the processor 52 may be embodied as a cache controller or a directory controller, or another kind of processing unit.

The cache 51 includes a tag array and a data array.

The processor 52 is configured to allocate a tag entry in the tag array for a data block.

The processor 52 is further configured to allocate a data entry in the data array for the data block when the data block is actively shared, and de-allocate the data entry when the data block is temporarily private or gets evicted in the data array.

Therefore the embodiments of the disclosure allocate data entry only when a block is actively shared and will not allocate data entry for block which is not actively shared, therefore smaller directory size can be achieved.

The components of the device 50 can perform the respective steps or achieve the respective functionalities as described with reference to FIG. 1 to FIG. 4 and thus will not be described redundantly hereinafter for simplicity.

Optionally, as an embodiment, when the data entry is de-allocated, the tag entry may include an owner pointer for indicating an exclusive owner of the block, as shown in FIG. 2.

Optionally, as another embodiment, when the data entry is allocated, the tag entry may include a forward pointer for indicating a position of the data entry, as shown in FIG. 2.

Optionally, as another embodiment, the data entry may include a reverse pointer for indicating a position of the tag entry, as shown in FIG. 2.

Optionally, as another embodiment, the forward pointer and the owner pointer may share or occupy the same bits to reduce the total bits of the tag entry, as shown in FIG. 2.

Optionally, as another embodiment, when the data entry is allocated, the tag entry and the data entry are linked through hardware hash components and tag selection bits, as shown in FIG. 4.

It is to be noted that the term such as "first, second, and so on" used in the context is only used to distinguish one entity or operation from another entity or operation, and is not intended to the actual relationship or sequence between these entities or operations. Furthermore, the term "include", "comprise" or the other variation is intended to a inclusion in inclusive sense, but not in exclude sense, thus the process, method, object or equipment including elements will not only include these elements, but also include other elements which are not clearly listed, or further include the elements inherent to the process, method, object or equipment. Unless defined otherwise, the elements defined by the term "comprise a . . . " would not exclude the presence of other identical elements in the process, method, object or equipment including the stated elements.

From the description of the embodiment of the disclosure, ones skilled in the art would clearly understand that the disclosure can be achieved by software together with the general-purpose hardware, and certainly can also be achieved only by hardware, but the former would be preferred. Based on this understanding, solutions of the disclosure can be implemented in the form of software products, and the software products can be stored in storage media, such as read-only memory (ROM)/random access memory (RAM), hard disks, compact disks and the like, containing several instructions capable of enabling a computer device (personal computer, server or network device, etc.) to execute the method described in the embodiments or part of the embodiments.

While the disclosure has been described by way of the preferred embodiments, it is to be noted that many modifications or variations can be made in the embodiments by ordinary ones skilled in the art as these modifications or variations should also fall within the protection scope of the disclosure.

What is claimed is:

1. A data processing method for a cache coherence directory architecture, the method comprising:
    allocating, by a data processing device, a tag entry in a tag array for a data block;
    allocating, by the data processing device, a data entry in a data array for the data block when the data block is actively shared, wherein the data block being actively shared corresponds to the data block being cached by at least two cores; and
    de-allocating, by the data processing device, the data entry when the data block is temporarily private or gets evicted in the data array, wherein the data block being temporarily private corresponds to the data block being cached by only one core;
    wherein the tag array and the data array are decoupled, wherein data entries of the data array are only allocated to actively shared data blocks, and wherein data blocks that are temporarily private only have tag entries but not data entries allocated thereto.

2. The method according to claim 1, wherein when the data entry is de-allocated, the tag entry comprises an owner pointer for indicating an exclusive owner of the data block.

3. The method according to claim 1, wherein when the data entry is allocated, the tag entry comprises a forward pointer for indicating a position of the data entry.

4. The method according to claim 1, wherein the data entry comprises a reverse pointer for indicating a position of the tag entry.

5. The method according to claim 1, wherein when the data entry is allocated, the tag entry and the data entry are linked through hardware hash components and tag selection bits in the tag entry.

6. A data processing device for a cache coherence directory architecture, the device comprising:
    a cache, comprising a tag array and a data array; and
    a processor, configured to
        allocate a tag entry in the tag array for a data block;
        allocate a data entry in the data array for the data block when the data block is actively shared, wherein the data block being actively shared corresponds to the data block being cached by at least two cores; and
        de-allocate the data entry when the data block is temporarily private or gets evicted in the data array, wherein the data block being temporarily private corresponds to the data block being cached by only one core;
    wherein the tag array and the data array are decoupled, wherein data entries of the data array are only allocated to actively shared data blocks, and wherein data blocks that are temporarily private only have tag entries but not data entries allocated thereto.

7. The device according to claim 6, wherein when the data entry is de-allocated, the tag entry comprises an owner pointer for indicating an exclusive owner of the data block.

8. The device according to claim 6, wherein when the data entry is allocated, the tag entry comprises a forward pointer for indicating a position of the data entry.

9. The device according to claim 6, wherein the data entry comprises a reverse pointer for indicating a position of the tag entry.

10. The device according to claim 6, wherein when the data entry is allocated, the tag entry and the data entry are linked through hardware hash components and tag selection bits in the tag entry.

* * * * *